Dec. 12, 1961    J. L. BOHN ET AL    3,012,470
HIGH SPEED STEREOSCOPIC CAMERA
Filed Dec. 4, 1959    4 Sheets-Sheet 1
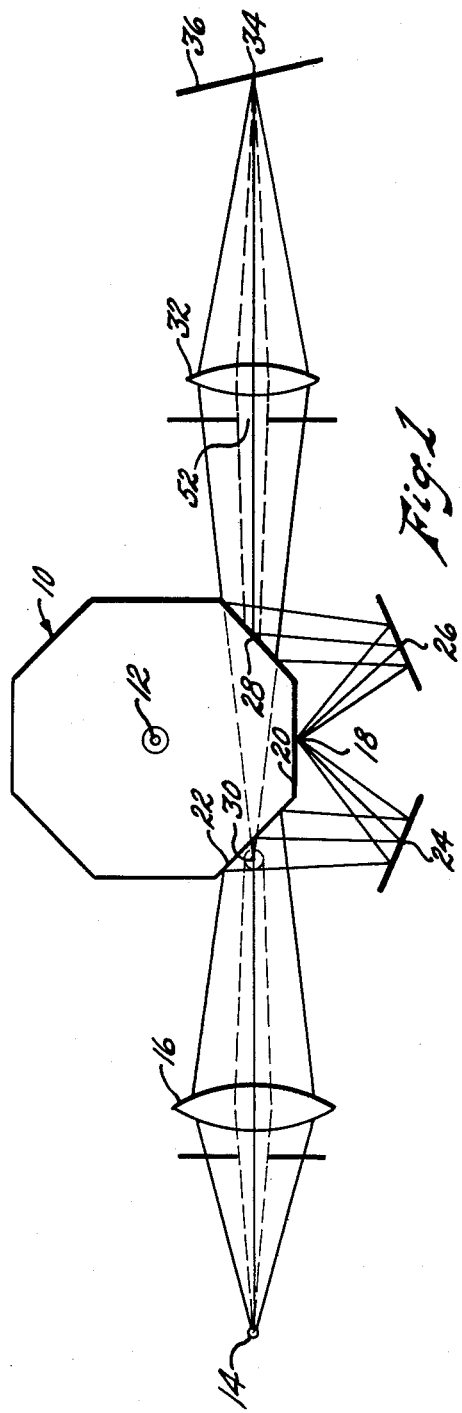
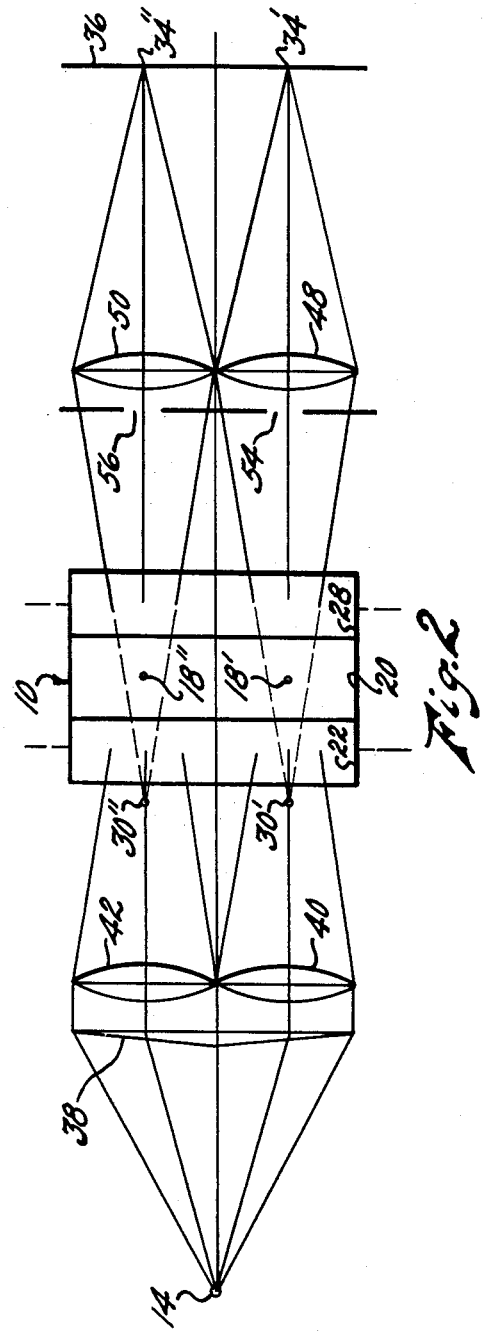
INVENTORS
JACOB L. BOHN
FRANCIS H. NADIG
AND THEODORE KORNEFF
BY
Wade Loguntry
Sherman H. Goldman
ATTORNEYS

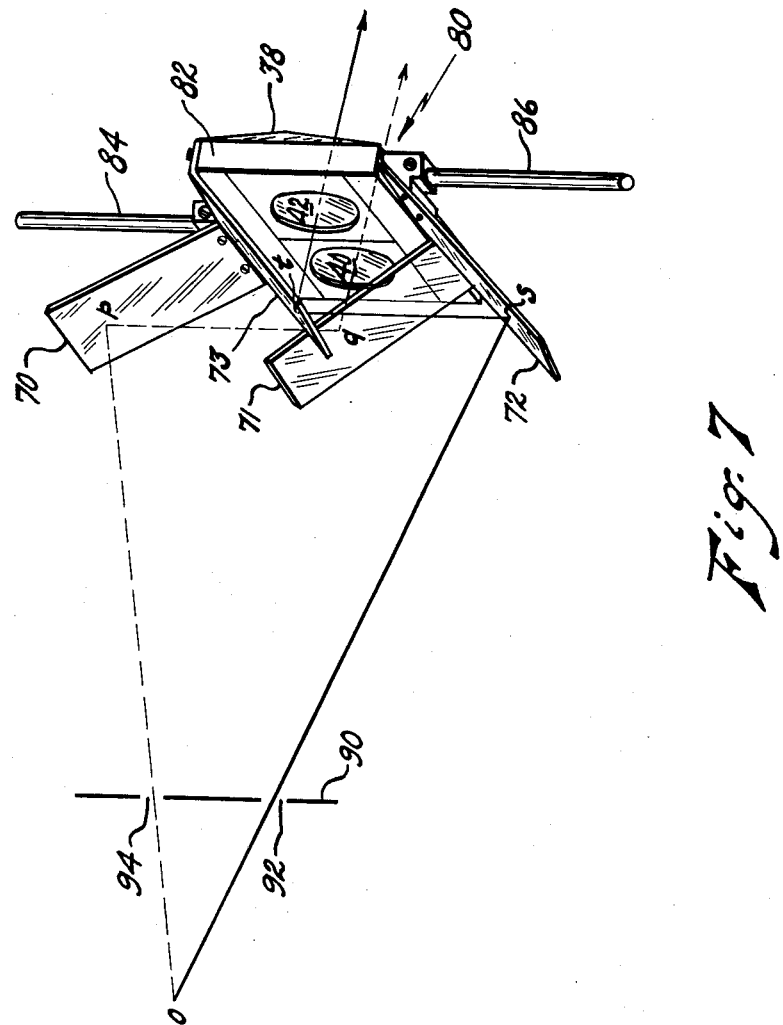

United States Patent Office 3,012,470
Patented Dec. 12, 1961

3,012,470
HIGH SPEED STEREOSCOPIC CAMERA
Jacob L. Bohn, Glenside, and Francis H. Nadig, Philadelphia, Pa., and Theodore Korneff, Burlington, N.J., assignors to the United States of America as represented by the Secretary of the Air Force
Filed Dec. 4, 1959, Ser. No. 857,475
5 Claims. (Cl. 88—16.6)

The present invention relates generally to high speed photography and is more particularly concerned with an improved stereoscopic system for producing a series of photographic images by the use of a rotating reflector with an image multiplication system.

Photographing exploding wire or other exploding materials presents several difficult problems which must be solved before photographs containing sufficient detail may be produced. Three major conditions must be fulfilled. The image of the explosion must be substantially stationary on the photographic film to avoid obtaining a space smear photograph. A group of successive photographs of a single explosion is desirable. The photograph of each group must have exposure times on the order of one microsecond or less with a substantial comparative time lapse between them.

In order to obtain photographs at various stages of the explosion, several expedients were tested with varying degrees of success; however, the exposure time was excessive, and, as a result, the result photographs lacked sufficient detail to provide adequate information. Attempts to obtain a series of photographs of each explosion were successful only after an image multiplier was used.

The system of this invention which includes a multiplier comprises a beam splitter, lens, and mirror arrangement which form separate, independent images of an object to be photographed of the desired phenomenon.

Accordingly, it is a primary object of this invention to provide a novel camera arrangement capable of high speed, multiframe stereoscopic photography of high speed phenomenon.

More specifically, it is an object of this invention to provide a system of mirrors for attachment to a multiframe camera for allowing stereoscopic photographs.

It is a further object of this invention to provide a novel stereoscopic camera arrangement that utilizes standard components that lend themselves to economical mass production manufacturing techniques.

The above, and still other objects, advantages and features of our invention will become more readily apparent from consideration of the following detailed description thereof, especially when taken in conjunction with the accompanying drawings, wherein:

FIG. 1 is a schematic illustration of a basic rotating mirror system;

FIG. 2 is a schematic illustration looking from the bottom of the system shown in FIGURE 1 and incorporating an image multiplication arrangement with the mirror arrangement removed for clarity;

FIG. 7 is a representation of the stereoscopic mirror arrangement for the double lens system of FIGURE 2.

Figure 3:
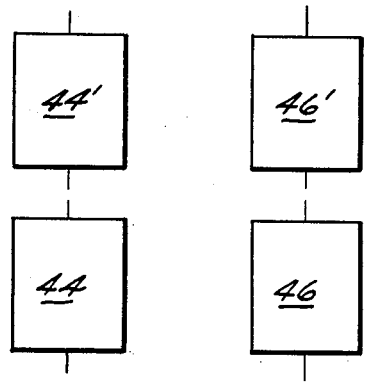
FIG. 3 illustrates the mirror arrangement utilized with the device of FIGURE 2.

The basic system shown in FIGURE 1, disclosed in our copending application, Serial No. 769,048, filed October 23, 1958, now Patent Number 2,961,918, operates primarily on the principle of the rotation of a light beam by a rotating mirror, and a brief explanation of this principle is presented. A multi-faced mirror is shown at 10. This mirror is here shown as octagonal and rotates about an axis through the point 12. The mirror 10 is preferably made of transparent plastic with the faces thereof aluminized. Rotation of the mirror 10 produces rotation of any light beams which strike it.

The reference character 14 designates a point in an object to be photographed. Light diverges from the point and falls upon a lens 16, converging at the point 18 on a face 20 of the mirror 10. The converging pencil of light undergoes two reflections in its passage from lens 16 to the point of convergence 18, one from a face 22 of the mirror and one from a stationary plane mirror 24.

The light is reflected at 18 from the face 20 and proceeds as a diverging pencil. After being reflected by another stationary plane mirror 26 and a face 28 of the mirror 10, it forms a virtual image of point 18, and hence of the point 14, at a point 30 in FIGURE 1. This virtual image at 30 of point 14 of the object to be photographed serves as a real image for a lens 32 which forms a real image of point 30 at 34 on a photographic plate 36. Thus, the diverging pencil of light rotates such that the light in this beam sweeps past an aperture 52 forming an image of 30 on the photographic plate.

FIGURES 2 and 3 represent the method for producing multiple images, as disclosed in our copending application, Serial No. 769,048, filed October 23, 1958, and shows diagrammatically the image formation of this system. By utilizing a double optical system, image multiplication may be achieved without any accompanying decrease in intensity. The embodiment of FIGURE 2 shows the point 14 of an object. A beam splitter shown as a biprism 38 forms the beams from 14 into two systems of rays which are parallel, thus avoiding a divergence which would require an impractical arrangement of succeeding optical elements. The biprism may be mounted on either side of lens system 40, 42 which are used to form two independent images of the object. For simplicity, only the point source 14 will be considered. Lens 42 is positioned, as shown, with respect to lens 40 thereby providing two similar and independent systems of beams of the type described relative to FIGURE 1 and in our copending application Ser. No. 769,048 with the difference that the beams are spaced. Lenses 40 and 42 form images 18' and 18" on mirror face 20 of mirror 10. FIGURE 3 shows, schematically, mirrors 44, 44' and 46, 46' which are utilized with the embodiment of FIGURE 2 in the position of mirrors 24 and 26 shown in FIGURE 1.

Mirrors 44, 44' and 46, 46' comprise double mirrors with 44' mounted in alignment with 44 and 46' mounted in alignment with 46. Mirror elements 44 and 44' are independently rotatable about their axis as are mirror elements 46 and 46'. Mirror 46 and 46' with surface 28 of mirror 10 form virtual images 30' and 30". Camera lenses 48 and 50 form images 34' and 34", respectively, of 30' and 30" on photographic plate 36.

Figure 4:
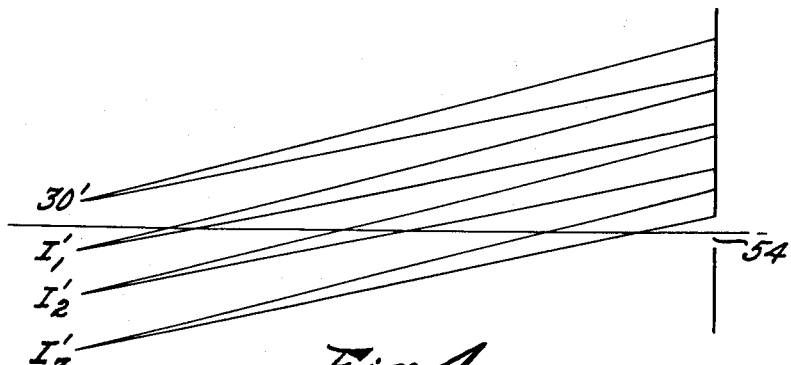
FIG. 4 illustrates the formation of successive images of the lower system of FIGURE 2.
Figure 5:
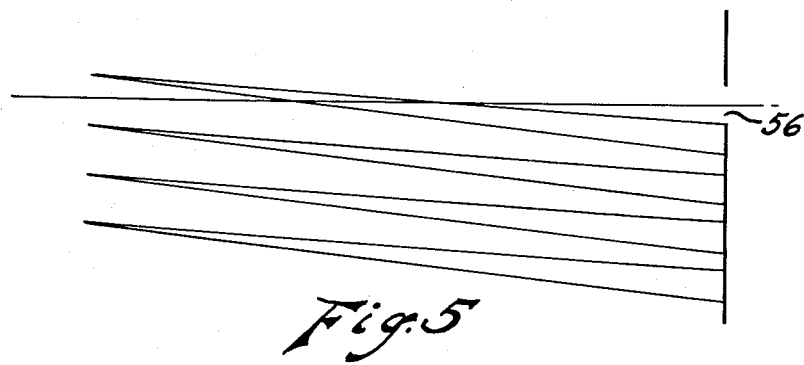
FIG. 5 illustrates the formation of successive images of the upper system of FIGURE 2.

Referring to FIGURES 4 and 5, when mirror 10 has been rotated counterclockwise to a position where the beam from virtual image $I_3$ of FIGURE 4, as formed by the lower system using lens 40 of FIGURE 2, has passed the aperture 54 and mirrors 44', 46' adjusted so the position of beams from 30", $I_1$" etc. of the upper system are as shown in FIGURE 5. Thus, it is apparent that further rotation of mirror 10 will now cause beams from 30", $I_1$", etc. to pass aperture 56 to give rise to a second series of images on the photographic plate spaced from the series produced by the passage of the beam from 30', $I_1'$, etc. across the aperture.

If there are $n$ images in the lower row on the photographic plate, a double beam system will yield 2n images.

The requirement for obtaining two photographs of an object for stereoscopic viewing effects is that the two photographs shall be taken from different points of view. A system of mirrors has been devised which may be used with a conventional single lens system or the principle thereof may be applied for an attachment to the high speed camera of FIGURE 2 to obtain a series of stereoscopic photographs.

Figure 6:
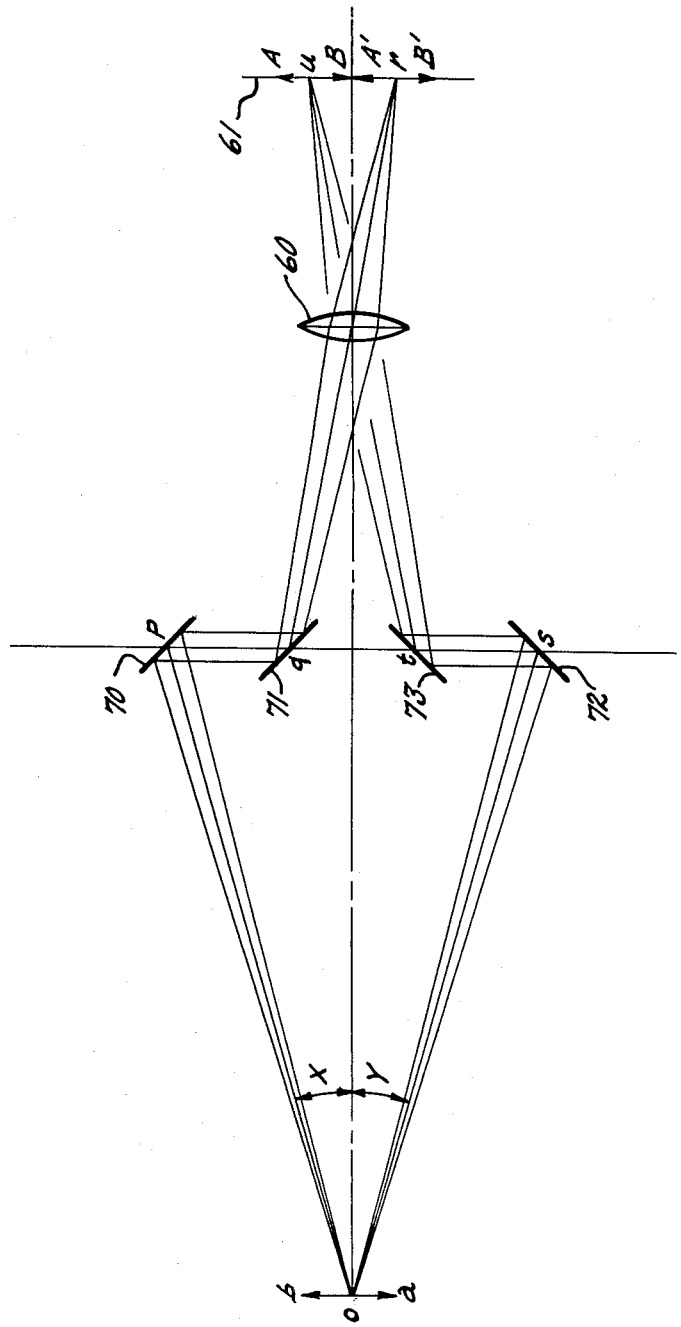
FIG. 6 is a schematic illustration of stereoscopic mirror attachment for a single lens system.

The lens attachment system is first described relative to a single lens system (FIGURE 6) such as is used in a conventional camera.

A camera lens 60 adjacent to a photographic plate 36 is to receive the stereoscopic attachment. Let o be a point in the center of an object ab. A ray leaving point o at an angle x relative to the axis of the camera represented by lens 60 and photographic plate 36 is caused to impinge on a front surface mirror 70 at point p which is then reflected as ray pq. Ray pq is reflected by another front surface mirror 71 at point q to pass through the center of lens 60 and proceed to point r on photographic plate 61. Another ray os leaves point o at an angle y with the optic axis of the lens system and, after reflections at points s and t on front surface mirrors 72 and 73, will pass through lens 60 and fall on photographic plate 36 at point u. The rays opqr and ostu may be considered central rays of diverging pencil beams from point o. These pencils will be diverging until they pass through lens 60 which causes them to become converging pencil beams such that the points of convergence are at r and u on photographic plate 61. Points r and u are real optical images of point o in the object. Rays from the object ab will be converged at AB if they travel by way of mirrors 72 and 73 and at A'B' if they travel by way of mirrors 70 and 71. AB and A'B' are separate images of ab with AB the image of ab from the angle y and A'B' is the image viewed from the angle x. These images meet the requirements for producing the stereoscopic effect when observed by means of a stereoscopic viewer. Mirrors 70, 71, 72 and 73 are rotatable about points p, q, s, and t, respectively, or some other points in the planes of the mirror to provide for the proper positioning of images AB and A'B' on the photographic plate. Movement of the mirrors 72 and 70 along an axis perpendicular to the optical axis of the camera permits adjustment or variation in angles x and y to obtain the optimum stereoscopic effect.

The stereoscopic mirror attachment is shown for application to the high speed camera embodiment of FIGURE 2. The attachment is applied to the double lensprism assembly 80 schematically shown in FIGURE 2 as comprising lenses 40, 42 and biprism 38, and shown in a constructional embodiment in FIGURE 7. In the embodiment the biprism 38 has been mounted on the opposite side of lenses 40, 42 as shown in FIGURE 2. It should be noted that this would not change the operation of the lens assembly as disclosed relative to FIGURE 2 and is an optional position of this means. The lenses 40, 42 and biprism 38 are mounted in a frame 82 to which a pair of side arms 84 and 86 are secured for mounting stereoscopic mirrors 70 and 72. Mirrors 71 and 73 are rigidly secured to the frame 80 so that their planes form an angle of approximately 45° with the axes of lenses 40 and 42, respectively. The mirrors in FIGURE 7 perform the same function relative to the high speed camera as the mirrors having the same numbers in FIGURE 6, as can be evidenced by the diagrammatic lines representing the rays opq and ost. Mirrors 70 and 72 are adjustable along and may be rotated about rods 84 and 86, respectively. Mirrors 73 and 71 differ from the embodiment described relative to FIGURE 7, in that the centers of said mirrors are arranged to lie on the axes of lenses 42 and 40, respectively. Furthermore, the pairs of mirrors are oriented to correspond with the orientation of the lenses. Thus the images of point o will be spaced. A timed relationship for simultaneous photographing of the image viewed from the separate angles is achieved by adjustment of mirrors 44, 44' and 46, 46', which are shown in FIGURE 3, in order to cause images 34' and 34" to appear simultaneously on photographic plate 36 (FIG. 2). Rotation of any mirror causes a displacement with respect to time of the image appearing at the photographic plate. Thus, adjustment of the angle of the mirrors with respect to the rotating mirror varies the angle of incidence and reflection of the beam through the system such that the final image may be displaced. As mirror 10 (FIG. 2) is rotated, a series of sets of double images will be formed on the photographic plate with each set being stereoscopic. A plate 90, having apertures 92 and 94, is utilized to reduce time smear in the same manner as explained in our copending application, Serial No. 769,048.

Although the invention has been described with reference to particular embodiments, it will be understood to those skilled in the art that the invention is capable of a variety of alternative embodiments within the spirit and scope of the appended claims.

We claim:

1. In combination a stereoscopic mirror system and a multiple image system, said multiple image system comprising means forming a pair of light channels for receiving intelligence from an object to be photographed, a rotating member having a plurality of reflecting surfaces thereon for receiving light energy from said means, a pair of oppositely inclined reflectors for each of the light channels for reflecting a beam of light incident thereon from said reflecting surfaces of said rotating member to successive faces thereof in a timed relationship, a member having a pair of apertures therein for projecting said beams, means for photographing the intelligence contained in said beams, and means forming a stereoscopic mirror attachment for rendering said multiple image system capable of stereoscopic photography, said last-mentioned means comprising a pair of mirrors for each light channel of said multiple image system, one of said mirrors of said pair being oriented to direct light energy impinging thereon into a light channel, and the other of said mirrors of said pair being oriented to receive light energy from said object to be photographed at an angle to the optical axis of said multiple image system to reflect said energy to the said one of said pair of mirrors such that the images in each channel are photographed simultaneously after having been viewed from separate directions.

2. A combination as defined in claim 1 wherein said separate channels are formed by a pair of coplanar lenses and a biprism.

3. A combination as defined in claim 1 including means for eliminating time smear.

4. A combination as defined in claim 1 including means for adjusting the other of said mirrors of said pair of mirrors for varying the angle of viewing.

5. A combination as defined in claim 1 wherein said one of said pair of mirrors is at an angle of approximately 45° with respect to its channel.

References Cited in the file of this patent

UNITED STATES PATENTS

| | | |
|---|---|---|
| 721,954 | Huet et al. | Mar. 3, 1903 |
| 2,639,653 | Fischer | May 26, 1953 |
| 2,693,128 | Dewhurst | Nov. 2, 1954 |
| 2,736,250 | Papritz | Feb. 28, 1956 |
| 2,946,257 | Strang et al. | July 26, 1960 |

FOREIGN PATENTS

| | | |
|---|---|---|
| 389,454 | France | June 29, 1908 |